US011294474B1

(12) United States Patent
Stewart et al.

(10) Patent No.: US 11,294,474 B1
(45) Date of Patent: Apr. 5, 2022

(54) CONTROLLING VIDEO DATA CONTENT USING COMPUTER VISION

(71) Applicant: Lenovo (Singapore) Pte. Ltd., Singapore (SG)

(72) Inventors: Aaron Michael Stewart, Raleigh, NC (US); Alden Rose, Durham, NC (US); Ellis Anderson, Greensboro, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/169,227

(22) Filed: Feb. 5, 2021

(51) Int. Cl.
*G06F 3/01* (2006.01)
*G06K 9/00* (2006.01)
*G06F 3/16* (2006.01)

(52) U.S. Cl.
CPC .............. *G06F 3/017* (2013.01); *G06F 3/167* (2013.01); *G06K 9/00355* (2013.01); *G06K 9/00389* (2013.01); *G06K 9/00671* (2013.01)

(58) Field of Classification Search
CPC ..... G06F 3/017; G06F 3/167; G06K 9/00389; G06K 9/00355; G06K 9/00671
See application file for complete search history.

(56) References Cited

U.S. PATENT DOCUMENTS

| 9,743,042 | B1 * | 8/2017 | Faulkner | H04N 7/15 |
| 10,444,955 | B2 * | 10/2019 | Riley | G06K 9/6202 |
| 10,572,027 | B2 * | 2/2020 | Poupyrev | G06K 9/00355 |
| 10,572,858 | B2 * | 2/2020 | Nelson | G06Q 10/109 |
| 10,585,485 | B1 * | 3/2020 | Karakotsios | G06F 3/017 |
| 10,616,559 | B1 * | 4/2020 | Verma | H04N 13/296 |
| 10,757,251 | B1 * | 8/2020 | Matula | G06K 9/00744 |
| 10,956,875 | B2 * | 3/2021 | Nelson | G06F 40/186 |
| 11,080,466 | B2 * | 8/2021 | Nelson | G06F 40/30 |
| 2009/0012788 | A1 * | 1/2009 | Gilbert | G10L 21/06 704/235 |
| 2009/0079816 | A1 * | 3/2009 | Qvarfordt | G06K 9/00335 348/14.16 |
| 2009/0210491 | A1 * | 8/2009 | Thakkar | G06Q 10/103 709/204 |
| 2009/0262187 | A1 * | 10/2009 | Asada | G06F 3/017 348/77 |
| 2010/0220172 | A1 * | 9/2010 | Michaelis | H04N 21/23424 348/14.08 |
| 2010/0246571 | A1 * | 9/2010 | Geppert | G06F 3/04817 370/352 |
| 2010/0315483 | A1 * | 12/2010 | King | H04N 7/147 348/14.08 |
| 2011/0157472 | A1 * | 6/2011 | Keskinen | G09B 21/009 348/564 |
| 2012/0026277 | A1 * | 2/2012 | Malzbender | H04N 7/15 348/14.07 |

(Continued)

*Primary Examiner* — Grant Sitta
(74) *Attorney, Agent, or Firm* — Schwegman Lundberg & Woessner, P.A.

(57) ABSTRACT

A virtual collaboration system receives input video data including a participant. The system analyzes the input video data to identify a gesture or a movement made by the participant. The system selects an overlay image as a function of the gesture or the movement made by the participant, incorporates the overlay image into the input video data, thereby generating output video data that includes the overlay image, and transmits the output video data to one or more participant devices.

19 Claims, 7 Drawing Sheets

(56) References Cited

U.S. PATENT DOCUMENTS

| | | | |
|---|---|---|---|
| 2012/0154513 A1* | 6/2012 | Su | G06F 3/01 |
| | | | 348/14.07 |
| 2012/0206558 A1* | 8/2012 | Setton | H04N 7/147 |
| | | | 348/14.03 |
| 2013/0321340 A1* | 12/2013 | Seo | G06F 3/04883 |
| | | | 345/174 |
| 2014/0118472 A1* | 5/2014 | Liu | H04M 3/563 |
| | | | 348/14.09 |
| 2015/0189233 A1* | 7/2015 | Carpenter | H04N 7/15 |
| | | | 348/14.08 |
| 2015/0288883 A1* | 10/2015 | Shigeta | H04N 5/23218 |
| | | | 345/642 |
| 2017/0272263 A1* | 9/2017 | Riley | H04N 7/15 |
| 2017/0277684 A1* | 9/2017 | Dharmarajan Mary | |
| | | | G06K 9/00355 |
| 2018/0053043 A1* | 2/2018 | Lawrence | H04N 7/15 |
| 2018/0208031 A1* | 7/2018 | Matsuoka | B60J 7/0435 |
| 2018/0359315 A1* | 12/2018 | Mujibiya | G06F 1/1684 |
| 2019/0011992 A1* | 1/2019 | Zhao | G06F 3/011 |
| 2019/0230310 A1* | 7/2019 | Faulkner | H04N 7/147 |
| 2019/0341050 A1* | 11/2019 | Diamant | H04N 7/155 |
| 2021/0076002 A1* | 3/2021 | Peters | G06K 9/00718 |
| 2021/0142568 A1* | 5/2021 | Kim | G09B 19/003 |
| 2021/0150731 A1* | 5/2021 | Saquib | G06T 7/20 |

\* cited by examiner

US 11,294,474 B1

CONTROLLING VIDEO DATA CONTENT USING COMPUTER VISION

BACKGROUND

Virtual collaboration, such as in Zoom meetings or Microsoft Teams meetings, relies heavily on broadcasting webcam feeds between participants. The field of view in these feeds and the size in which they are viewed on the receiving end do not afford much use of reading body language or non-verbal cues.

To address the lack of non-verbal cues and inability to speak without distracting the participants, collaboration software such as Zoom and Teams allows users to "raise their hand" or add an emoji to the video feed being shared. To invoke these features, the user must tap a respective icon in the software's graphical user interface (GUI). Additionally, participants may utilize instant messaging or chat sidebars to ask questions or give updates like "I'll be right back." None of these features however are as quick or natural to employ as non-verbal cues or sidebar vocalizations that would occur if the collaboration was held with all members in person.

SUMMARY

A method includes receiving, into a computer processor, input video data comprising a participant; analyzing the input video data to identify a gesture or a movement made by the participant; selecting an overlay image as a function of the gesture or the movement made by the participant; incorporating the overlay image into the input video data, thereby generating output video data comprising the overlay image; and transmitting the output video data to one or more participant devices.

A machine-readable storage medium has instructions that are executable by a processor to perform operations. The operations include receiving, into a computer processor, input video data comprising a participant; analyzing the input video data to identify a gesture or a movement made by the participant; selecting an overlay image as a function of the gesture or the movement made by the participant; incorporating the overlay image into the input video data, thereby generating output video data comprising the overlay image; and transmitting the output video data to one or more participant devices.

A computer system includes a processor and a storage device. The processor and the storage device are operable for receiving, into a computer processor, input video data comprising a participant; analyzing the input video data to identify a gesture or a movement made by the participant; selecting an overlay image as a function of the gesture or the movement made by the participant; incorporating the overlay image into the input video data, thereby generating output video data comprising the overlay image; and transmitting the output video data to one or more participant devices.

DETAILED DESCRIPTION

Figure 1A:
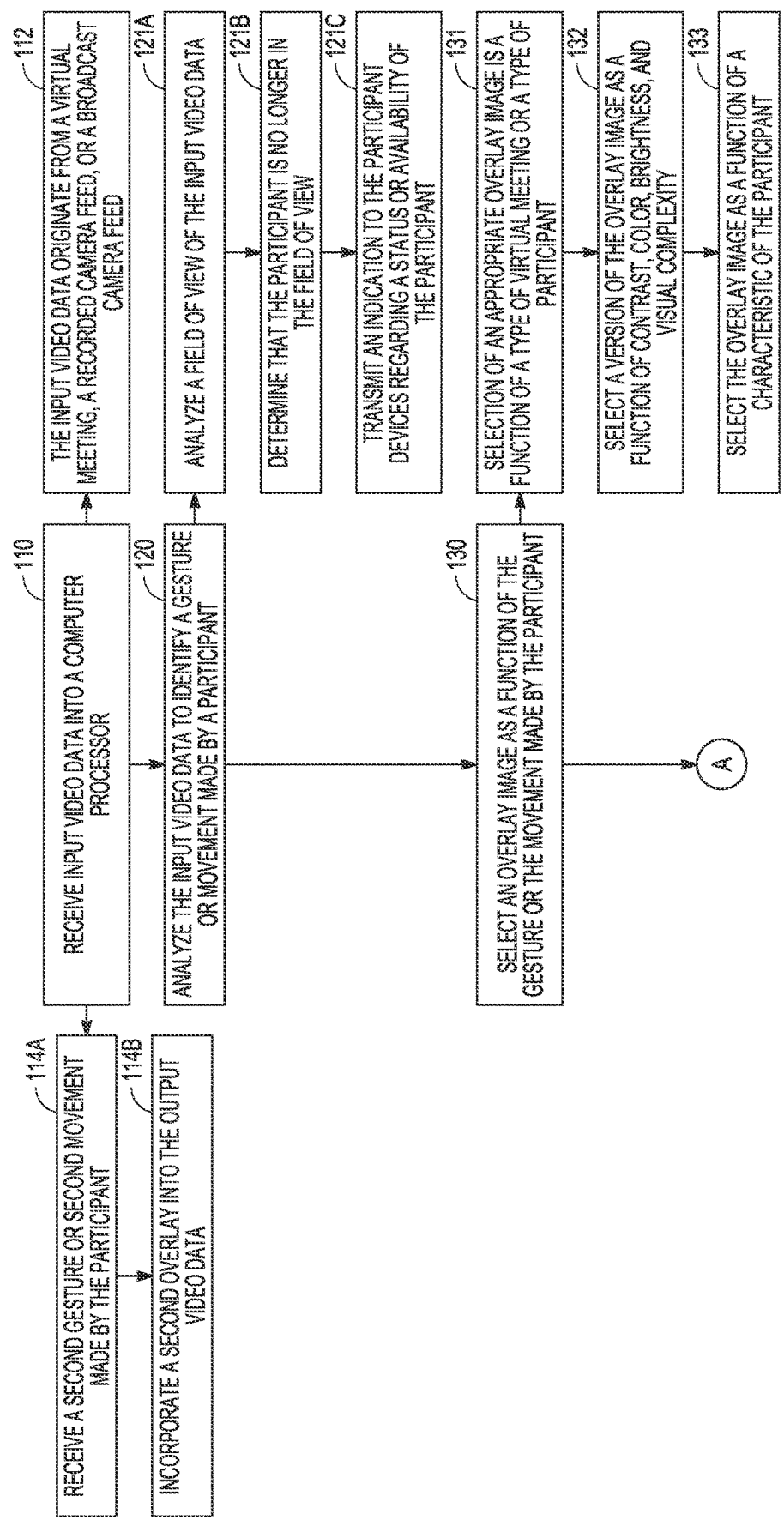
FIGS. 1A, 1B, and 1C are a block diagram illustrating features and operations of a system and method to control video data content using computer vision.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware-based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor. ASIC, microprocessor, or other type of processor operating on a computer system, such as a personal computer, server or other computer system. The article "a" or "an" means "one or more" unless explicitly limited to a single one.

An embodiment involves a virtual meeting or other virtual collaboration in which a webcam views a participant during the virtual meeting or collaboration. The embodiment receives a raw feed of video data from the webcam. The raw feed normally contains the participant, but at times the participant may have stepped away from the virtual collaboration, and the handling of such situations is discussed in detail further herein. The embodiment uses computer vision analyses and techniques to identify gestures made or movements made by the participant, and based on the gestures or movements, the embodiment overlays an image into the video data that is transmitted to the other participants in the virtual collaboration. For example, a participant may want to raise his or her hand during the virtual collaboration, but this may be difficult to see by the other participants in view of the size of the participants' screens and/or the clutter on the participants' screens. To solve this, an overlay, which is easier to see, is placed into the video feed that is transmitted to the other participants. In an embodiment, one process or software module handles the sensing and identification of the gesture or movement, and the incorporating of the overlay into the video data. These video data with the overlay are then transmitted to another process or software module which handles the display of the video data with the overlay on participants' device screens. While in one embodiment the present disclosure can be used in connection with virtual collaborations and webcams, other embodiments can be used in connection with a recorded camera feed or a broadcast camera feed.

Figure 1B:
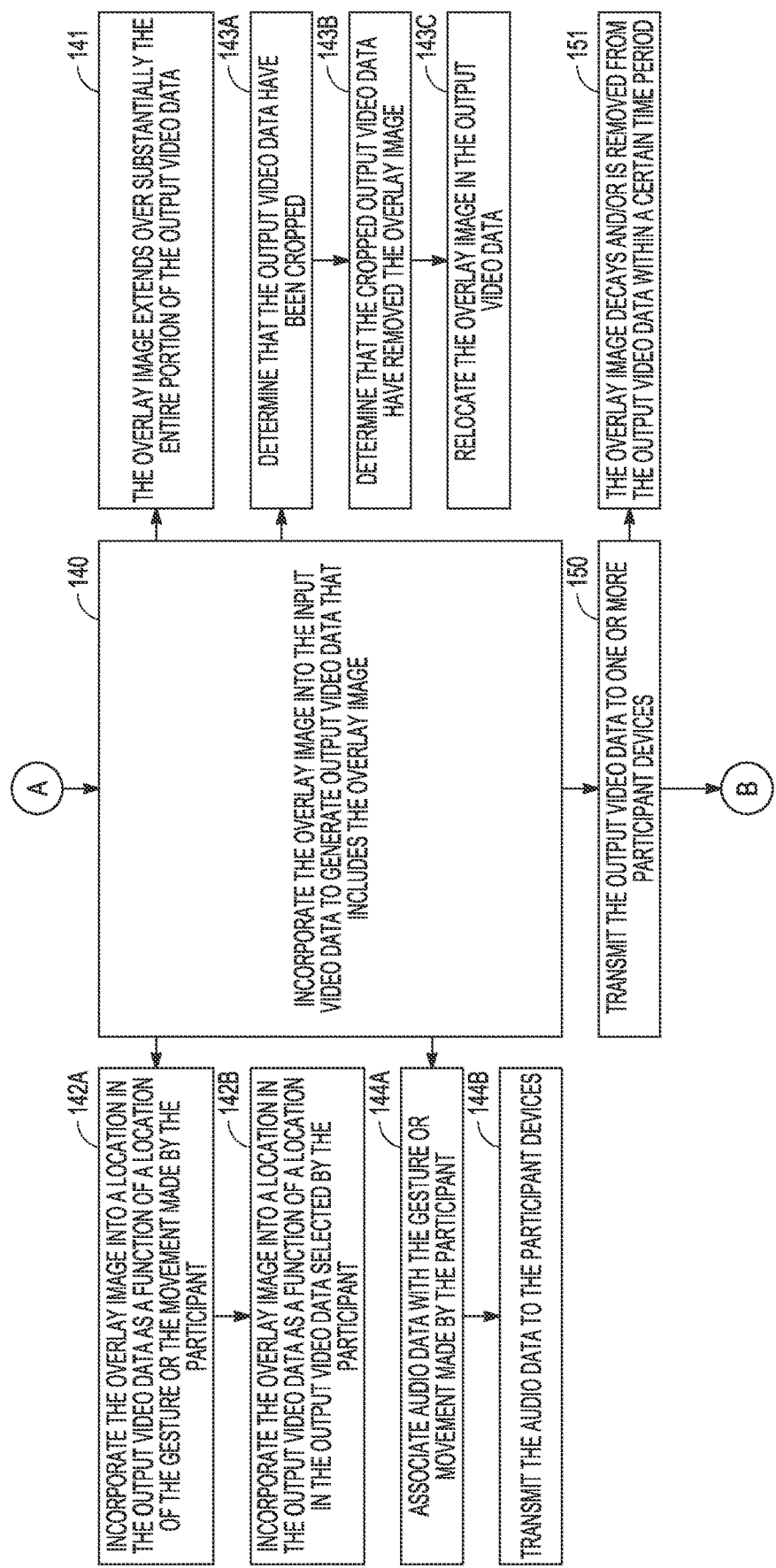
Figure 1C:
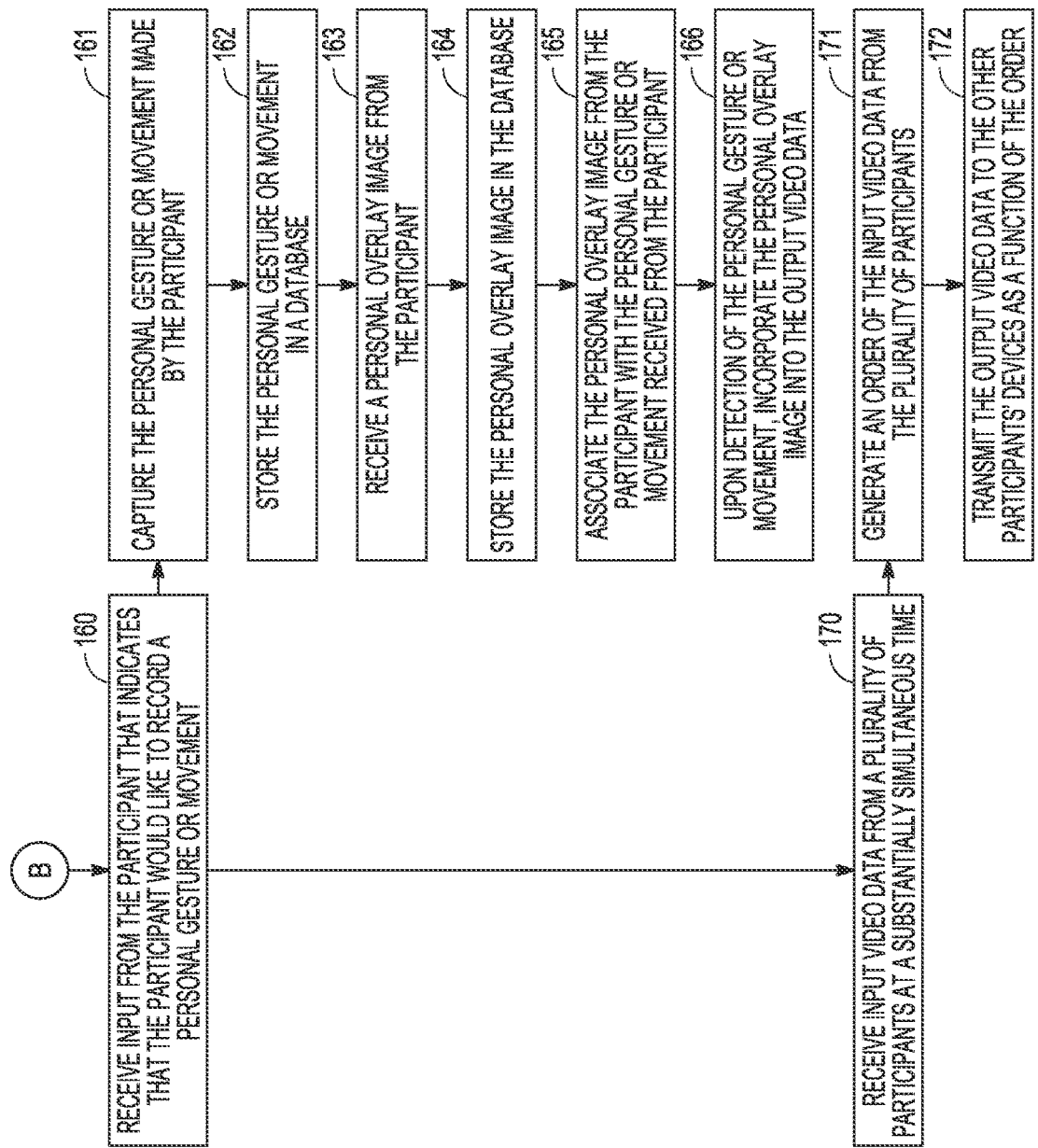

FIGS. 1A, 1B, and 1C illustrate operations and features of an embodiment that controls video data content using computer vision analyses and techniques. FIGS. 1A, 1B, and 1C include operation or feature blocks 110-172. Though arranged substantially serially in the example of FIGS. 1A, 1B, and 1C, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 1A, 1B, and 1C, at 110, input video data are received into a computer processor. As indicated at 112, these input video data can originate from a virtual meeting, a recorded camera feed, a broadcast camera feed, or any other source that can generate video data. For example, in connection with a virtual meeting, the input video data can originate from a web cam that is associated with a meeting participant's laptop, personal computer, or other device. In the context of a virtual meeting, the input video data normally include an image of the participant in the virtual meeting.

At 120, the input video data are analyzed to identify a gesture or movement that is made by the participant in the virtual meeting. These gestures and movements are identified using any one of several well-kwon computer vision analyses and techniques. Any gesture or movement can be identified by the computer vision analysis including, but not limited to, a hand wave, a smile, a thumbs up or a thumbs down, a tilting or cocking of the head, a raising of a hand, a hand held up with the index finger raised, a hand held up with two fingers raised, a hand held up with all the fingers spread apart, the field of view devoid of a person, a single wave of a hand or a hand movement up or down, a hand approaching the camera, a snapping of the fingers in front of the camera, a turning of a participant's head to the side or away from the screen, and recognizable sign language.

At 130, an overlay image is selected as a function of the gesture or the movement that was made by the participant. As indicated at 131, the selection of an appropriate overlay image can be a function of a type of the virtual meeting or a type of participant associated with the virtual meeting. For example, overlay images that are selected for a virtual meeting of a corporate board of directors might be different than the overlay images that are selected for a virtual collaboration in an online gaming environment. Additionally, as indicated at 132, a version of the overlay image can be selected as a function of contrast, color, brightness, and visual complexity differences between the overlay image and a background of the output video data. For example, if the background of the output video data is predominantly light colored, then a contrasting dark color of the overlay image may want to be selected. As further indicated at 133, the overlay image is selected as a function of a characteristic of the participant including skin color, gender, hair color, hair length, and/or eye color.

At 140, the overlay image is incorporated into the input video data, which generates output video data that includes the overlay image. As indicated at 141, the overlay image extends over substantially the entire portion of the output video data. For example, a textual message of "Be right back" can be placed over the entire portion of the screen, and the background can remain as it is seen by the camera, or the background can be completely blocked out for example with a solid color background.

At 150, the output video data are transmitted to one or more participant devices that are associated with other participants in the online collaboration. As indicated at 151, in an embodiment, the overlay image decays and/or is removed from the output video data within a certain time period, and thus disappears from the other participants' devices. This certain time period can be a preset, standard duration such as two minutes, or the time can be set by a participant and stored in a personal profile of the participant.

Using the example gestures and movements disclosed above, the following interpretations, meanings, and overlays can be assigned and then selected upon detection of the gesture or movement.

Figure 2B:
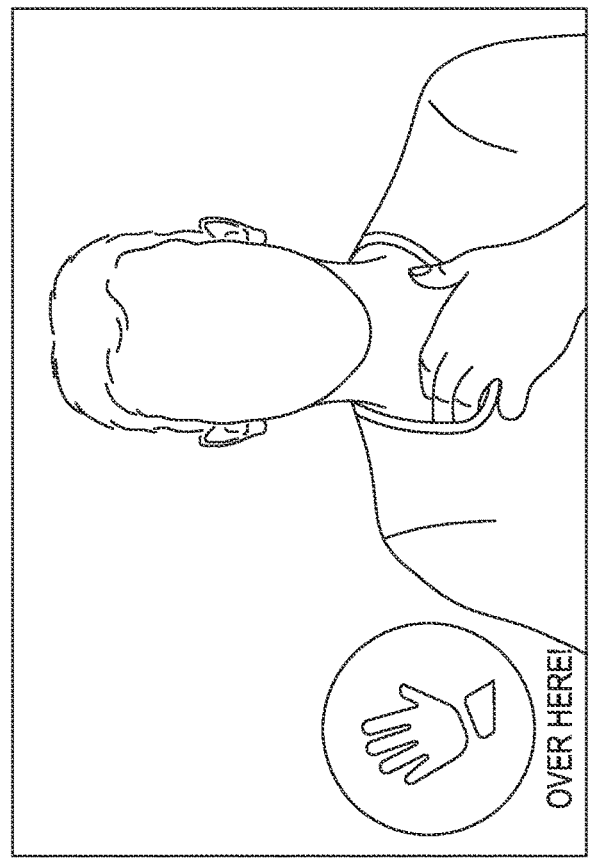
FIG. 2B illustrates an example of output video data with an overlay image.
Figure 2A:
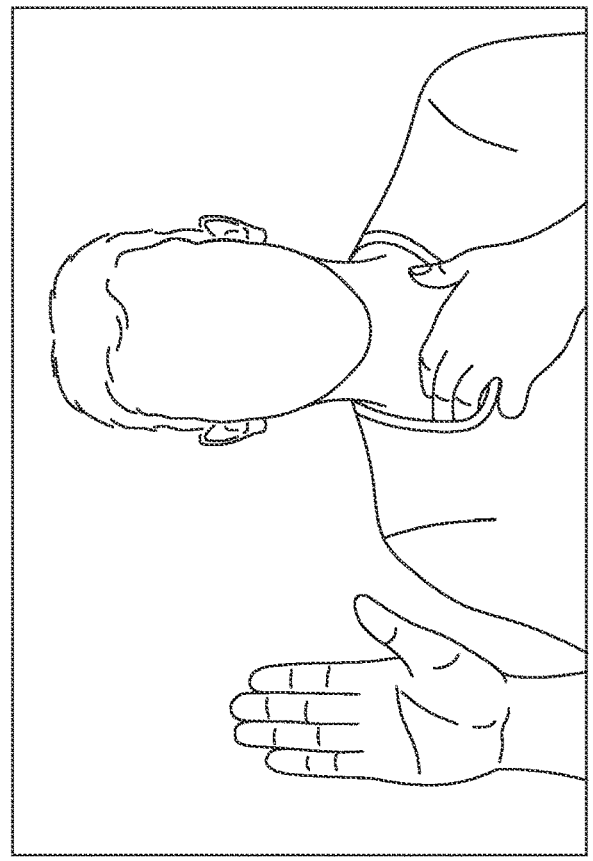
FIG. 2A illustrates an example of input video data.

The hand wave can be interpreted as the participant saying "Hi" or "Bye" or "Over here." and an overlay image that includes a waving emoji graphic could be selected and thereafter displayed on the other participants' devices. This is illustrated in FIGS. 2A and 2B, wherein the hand wave is detected in FIG. 2A, and then a hand wave emoji, which can be more visible than the participant's hand, is selected and overlaid in the output of FIG. 2B.

The smile can be interpreted as a moment of happiness for the participant, and an overlay image of smiley face emoji could be selected and thereafter displayed on the other participants' devices. The thumbs up or thumbs down can be interpreted as the participant exhibiting approval or disapproval, and an overlay image of a thumbs up or thumbs down emoji could be selected, overlayed on the outgoing video feed, and thereafter displayed on the other participants' devices. The tilting or cocking of the participants' head can be interpreted as confusion on the part of the participant, and an overlay image of an emoji exhibiting confusion could be selected, overlayed on the outgoing video feed, and thereafter displayed on the other participants' devices. The raising of the participant's hand can be interpreted as the participant having a question, and an overlay image of a hand-raised emoji could be selected, overlayed on the outgoing video feed, and thereafter displayed on the other participants' devices. See once again, FIGS. 2A and 2B.

Figure 3A:
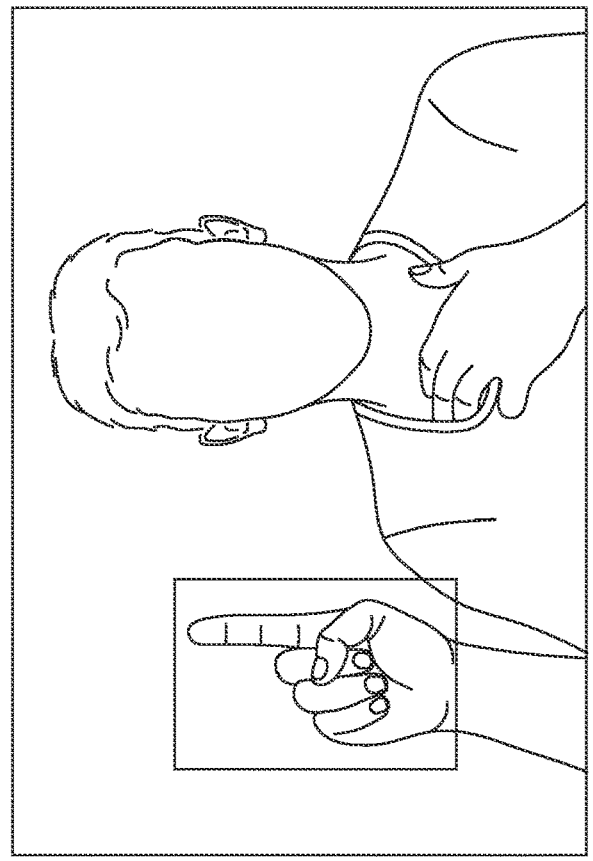
FIG. 3A illustrates another example of input video data.
Figure 3B:
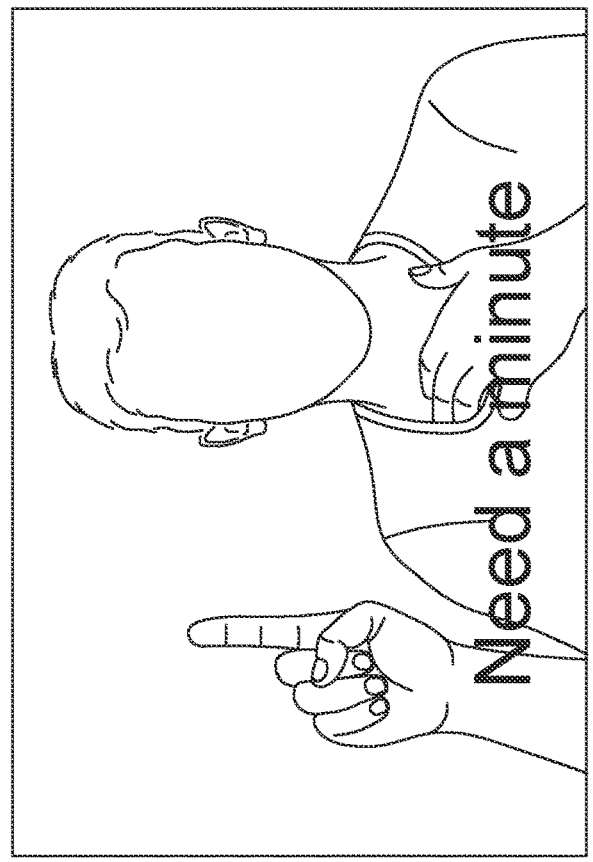
FIG. 3B illustrates another example of output video data with an overlay image.

The hand held up with the index finger raised can be interpreted as the participant indicating that he or she "Needs a minute" for one reason or another, and an overlay image that includes "Need a minute" text could be selected, overlayed on the outgoing video feed, and thereafter displayed on the other participants' devices. This is illustrated in FIGS. 3A and 3B. Similarly, the hand held up with two fingers raised can be interpreted as the participant needing a couple of minutes, and an overlay image of "Need a minute" or "Need a couple minutes" could be selected, overlayed on the outgoing video feed, and thereafter displayed on the other participants' devices.

Figure 4B:
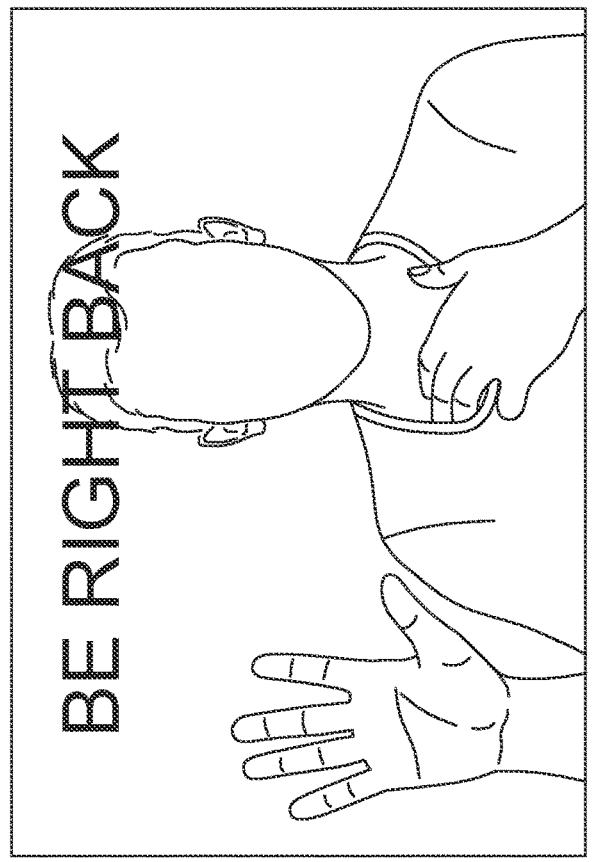
FIG. 4B illustrates another example of output video data with an overlay image.
Figure 4A:
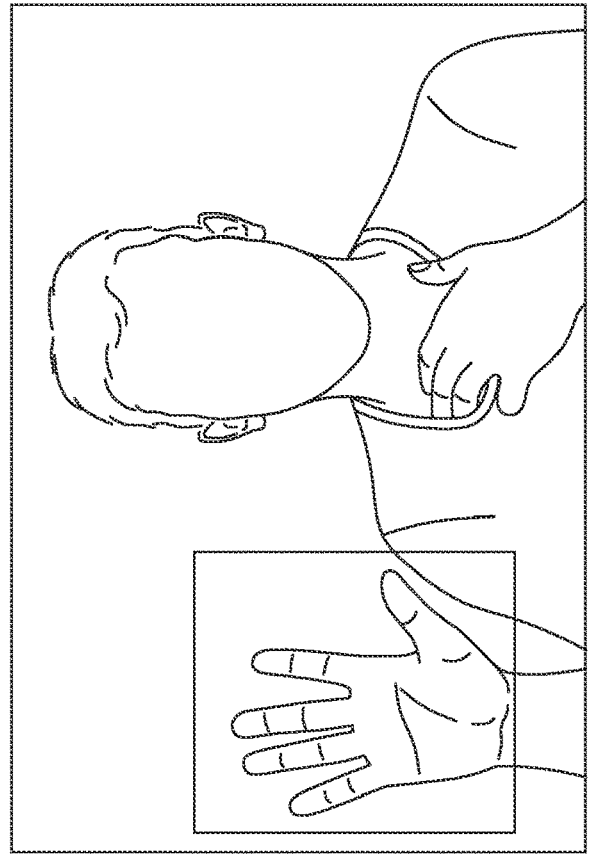
FIG. 4A illustrates another example of input video data.

The hand held up with all the fingers spread apart can be interpreted as the participant indicating that he or she has to leave, but will be back in five minutes, and an overlay image that includes "Be right back" or "Be back in five minutes" text could be selected, overlayed on the outgoing video feed, and thereafter displayed on the other participants' devices. This is illustrated in FIGS. 4A and 4B. Similarly, when the field of view is devoid of a person, this can be interpreted as the participant having left the meeting for the time being, and an overlay image including "Be back soon" could be selected, overlayed on the outgoing video feed, and thereafter displayed on the other participants' devices.

The single wave of a hand or a hand movement up or down can be interpreted as a "hide me" action, that is, the participant has to leave for a minute, but will be right back, and the view of the participant should be somehow hidden. The overlay image can then hide the participant in some manner, such as via a darkened screen, and the darkened screen would be displayed on the other participants' devices. Similarly, the hand approaching the camera gesture or movement can be interpreted as a "hide me" gesture, and an overlay image that includes "I'm here & listening" or "be right back" text could be selected, overlayed on the outgoing video feed, and thereafter displayed on the other participants' devices.

The hand snapping fingers in front of the camera can be interpreted as the participant indicating that he or she is back from a break or short absence, and that any overlay message or hiding that was displayed in the participant's absence can now be terminated and a live feed of the participant can be resumed, and this live feed can be displayed once again on the other participants' devices.

The turning of the head to the side or away from the camera can be interpreted as the participant having to turn his or her attention to another matter for the moment. However, the participant may not want to display any type of message to the other participants. In such an instance, the participant may want a bit of privacy while the participant takes care of the other matter, and the overlay image can be such that the outgoing feed is blurred as it is displayed on the other participants' devices.

An embodiment can determine that the participant's gesture is a recognizable sign language, and upon that determination, a textual translation of the sign language can be incorporated into the output video data that then displayed on the other participants' devices.

In addition to the gestures and movements discussed above, an embodiment can further at 121A analyze the field of view of the input video data, at 121B determine that the participant is no longer in the field of view of the input video data, and at 121C transmit an indication to the one or more participant devices regarding a status or availability of the participant.

As indicated at 142A, the overlay image is incorporated into a location in the output video data as a function of the location of the gesture or the movement made by the participant in the input video data. For example, if the participant raises his or her hand to get the attention of the other participants, then the overlay image can be in a location that is directly over the raised hand. Additionally, the overlay image can include an icon of a hand that is more easily visible by the other participants because of the size, color, movement, flashing, or other characteristic of the icon. In the alternative, as indicated at 142B, the overlay image is incorporated into a location in the output video data as a function of a location in the output video data selected by the participant. For example, the participant may want a textual message such as "Be right back" to be displayed on the top of other participants' screens, since the participant may believe that such a location is more of an attention getter.

In yet another embodiment, commencing at operation 143A, it is determined that the output video data have been cropped. Then, at 143B, it is further determined that the cropped output video data have removed or partially removed the overlay image. Upon that determination, then at 143C, the overlay image is relocated in the output video data so that it is once again visible on the participant's device.

In another embodiment, as indicated starting at operation 160, input is received from the participant that indicates that the participant would like to record a personal gesture or movement. That is, one that is not within the knowledge or function of the current system. At 161, the personal gesture or movement made by the participant is captured from the input video data, and at 162 that personal gesture or movement is stored in a database. Sometime later, at 163, a personal overlay image that is to be associated with the personal gesture or movement is received from the participant. The personal overlay image is stored in the database at 164, and at 165, the personal overlay image from the participant is associated with the personal gesture or movement received from the participant (operation 161). Then, at 166, upon detection of the personal gesture or movement, the personal overlay image is incorporated into the output video data.

As indicated at 144A, audio data can be associated with the gesture or movement made by the participant, and at 144B, the audio data, along with the overlay image, can be transmitted to the one or more participant devices. For example, in connection with a participant snapping his or her fingers in front of the camera, an audio file of fingers snapping can be transmitted to the other participant devices.

In another embodiment, as indicated at 114A, a second gesture or second movement made by the participant is received into the system, and at 114B, a second overlay is incorporated into the output video data as a function of the second gesture or second movement. For example, the second gesture could indicate that the participant is back from a break, and that the overlay image can be now removed from the output data. As another example, the second gesture could indicate that the overlay image should be changed or modified in some manner, such as the display of "Need another five minutes."

As indicated at 170, input video data can be received from a plurality of participants at a substantially simultaneous time. When this occurs, then at operation 171, an order of the input video data from the plurality of participants is generated. Then, at 172, the output video data are transmitted to the other participants' devices as a function of the order. In this embodiment, a process could observe the time of arrival from the plurality of participants, and then pass that information back down to each participant involved so that another process such as a client utility running the overlay function could react accordingly.

Figure 5:
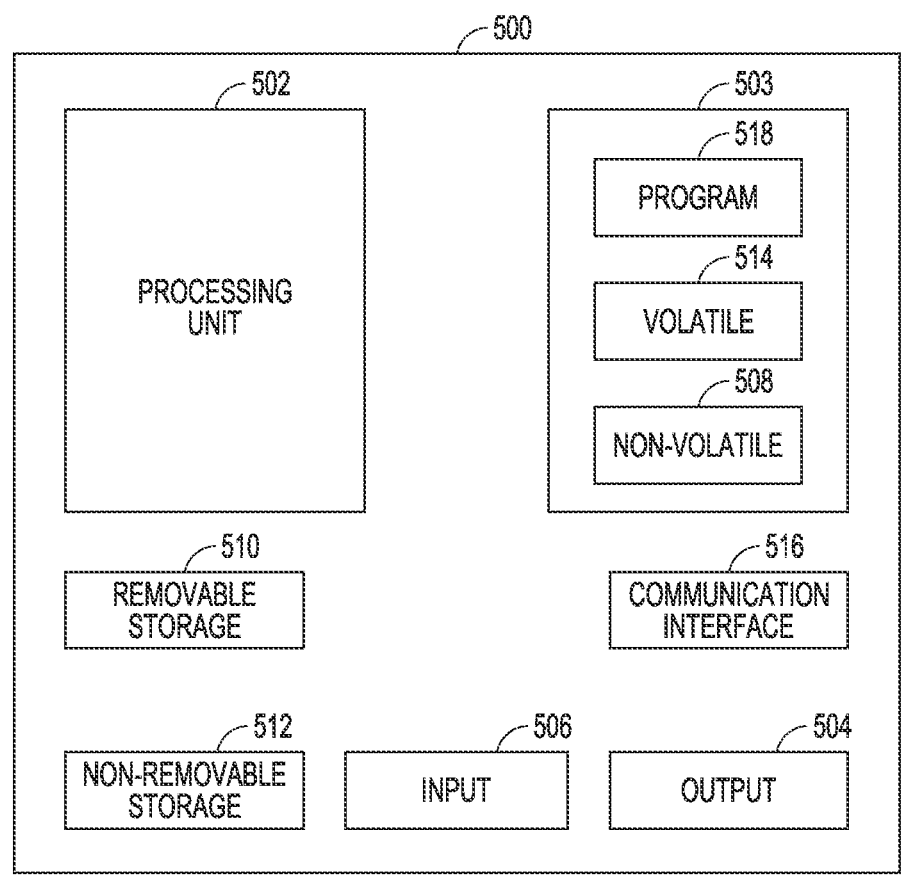
FIG. 5 is a block diagram of computer system used to implement methods according to an example embodiment.

FIG. 5 is a block schematic diagram of a computer, 500 to implement computing resources according to example embodiments. All components need not be used in various embodiments. One example computing device in the form of a computer 500, may include a processing unit 502, memory 503, removable storage 510, and non-removable storage 512. Sensors may be coupled to provide data to the processing unit 502. Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 500 may include or have access to a computing environment that includes input 506, output 504, and a communication connection 516. Output 504 may include a display device, such as a touchscreen, that also may serve as an input device. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 500. A hard drive, CD-ROM, DRAM, and RAM are some examples of data storage devices including a non-transitory computer-readable medium. For example, a computer program 518 may be used to cause processing unit 502 to perform one or more methods or algorithms described herein. Computer program 518 may be stored on a device or may be downloaded from a server to a device over a network such as the Internet. Computer-readable instructions may also be included on a computer readable storage medium that is being vended and/or provided, where the computer readable storage medium is defined as not encompassing a transitory signal, carrier wave, and/or a signal per se.

EXAMPLES

Example 1 is a process that includes receiving, into a computer processor, input video data comprising a participant; analyzing the input video data to identify a gesture or a movement made by the participant; selecting an overlay image as a function of the gesture or the movement made by the participant; incorporating the overlay image into the input video data, thereby generating output video data comprising the overlay image; and transmitting the output video data to one or more participant devices.

Example 2 includes the process of example 1 and further includes analyzing a field of view of the input video data; determining that the participant is no longer in the field of view of the input video data; and transmitting an indication to the one or more participant devices regarding a status or availability of the participant.

Example 3 includes the process of example 1 and further includes incorporating the overlay image into a location in the output video data as a function of a location of the gesture or the movement made by the participant in the input video data.

Example 4 includes the process of example 1 and further includes incorporating the overlay image into a location in the output video data as a function of a location in the output video data selected by the participant.

Example 5 includes the process of example 1 and further includes receiving an input from the participant indicating that the participant would like to record a personal gesture or movement; capturing the personal gesture or movement made by the participant from the input video data; and storing the personal gesture or movement in a database.

Example 6 includes the process of example 5 and further includes receiving a personal overlay image from the participant; storing the personal overlay image in the database; associating the personal overlay image from the participant with the personal gesture or movement received from the participant; and upon detection of the personal gesture or movement, incorporating the personal overlay image into the output video data.

Example 7 includes the process of example 1 and further includes associating audio data with the gesture or movement made by the participant; and transmitting the audio data to the one or more participant devices.

Example 8 includes the process of example 1 and further includes receiving a second gesture or second movement made by the participant; and incorporating a second overlay into the output video data as a function of the second gesture or second movement.

Example 9 includes the process of example 1 and further includes removing the overlay image from the output video data within a preset time period.

Example 10 includes the process of example 1 and further includes determining that the input video data comprise a sign language; and incorporating into the output video data a textual translation of the sign language.

Example 11 includes the process of example 1 and further includes selecting an appropriate overlay image as a function of a type of the virtual meeting or a type of participant associated with the virtual meeting.

Example 12 includes the process of example 1 and further includes selecting a version of the overlay image as a function of one or more of contrast, color, brightness, and visual complexity differences between the overlay image and a background of the output video data.

Example 13 includes the process of example 1 and further includes receiving the input video data from a plurality of participants at a substantially simultaneous time; generating an order of the input video data from the plurality of participants; and transmitting the output video data as a function of the order.

Example 14 includes the process of example 1 and further includes wherein the overlay image comprises a substantially entire portion of the output video data.

Example 15 includes the process of example 1 and further includes determining that the output video data has been cropped; determining that the cropped output video data has removed or partially removed the overlay image; and relocating the overlay image in the output video data.

Example 16 includes the process of example 1 and further includes blurring the output video data as a function of the gesture or movement made by the participant.

Example 17 includes the process of example 1 and further includes selecting the overlay image as a function of a characteristic of the participant comprising one or more of skin color, gender, hair color, hair length, and eye color.

Example 18 includes the process of example 1 and further includes wherein the input video data comprise a virtual meeting, a recorded camera feed, or a broadcast camera feed.

Example 19 is a computer readable medium comprising instructions that when executed by a processor execute a process comprising receiving, into a computer processor, input video data comprising a participant; analyzing the input video data to identify a gesture or a movement made by the participant; selecting an overlay image as a function of the gesture or the movement made by the participant; incorporating the overlay image into the input video data, thereby generating output video data comprising the overlay image; and transmitting the output video data to one or more participant devices.

Example 20 is a system comprising a computer processor; and a computer storage device coupled to the computer processor; wherein the computer processor and the computer storage device are operable for receiving, into a computer processor, input video data comprising a participant; analyzing the input video data to identify a gesture or a movement made by the participant; selecting an overlay image as a function of the gesture or the movement made by the participant; incorporating the overlay image into the input video data, thereby generating output video data comprising the overlay image; and transmitting the output video data to one or more participant devices.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A process comprising:
receiving, into a computer processor, input video data comprising a participant;
analyzing the input video data to identify a gesture or a movement made by the participant;
selecting an overlay image as a function of the gesture or the movement made by the participant;
incorporating the overlay image into the input video data, thereby generating output video data comprising the overlay image;
transmitting the output video data to one or more participant devices;
receiving an input from the participant indicating that the participant would like to record a personal gesture or movement;
capturing the personal gesture or movement made by the participant from the input video data; and
storing the personal gesture or movement in a database.

2. The process of claim 1, comprising incorporating the overlay image into a location in the output video data as a function of a location of the gesture or the movement made by the participant in the input video data.

3. The process of claim 1, comprising incorporating the overlay image into a location in the output video data as a function of a location in the output video data selected by the participant.

4. The process of claim 1, comprising:
receiving a personal overlay image from the participant;
storing the personal overlay image in the database;
associating the personal overlay image from the participant with the personal gesture or movement received from the participant; and
upon detection of the personal gesture or movement, incorporating the personal overlay image into the output video data.

5. The process of claim 1, comprising:
associating audio data with the gesture or movement made by the participant; and
transmitting the audio data to the one or more participant devices.

6. The process of claim 1, comprising:
receiving a second gesture or second movement made by the participant; and
incorporating a second overlay into the output video data as a function of the second gesture or second movement.

7. The process of claim 1, comprising removing the overlay image from the output video data within a preset time period.

8. The process of claim 1, comprising:
determining that the input video data comprise a sign language; and
incorporating into the output video data a textual translation of the sign language.

9. The process of claim 1, comprising selecting an appropriate overlay image as a function of a type of the virtual meeting or a type of participant associated with the virtual meeting.

10. The process of claim 1, comprising selecting a version of the overlay image as a function of one or more of contrast, color, brightness, and visual complexity differences between the overlay image and a background of the output video data.

11. The process of claim 1, comprising:
receiving the input video data from a plurality of participants at a substantially simultaneous time;
generating an order of the input video data from the plurality of participants; and
transmitting the output video data as a function of the order.

12. The process of claim 1, wherein the overlay image comprises a substantially entire portion of the output video data.

13. The process of claim 1, comprising:
determining that the output video data has been cropped;
determining that the cropped output video data has removed or partially removed the overlay image; and
relocating the overlay image in the output video data.

14. The process of claim 1, comprising blurring the output video data as a function of the gesture or movement made by the participant.

15. The process of claim 1, comprising selecting the overlay image as a function of a characteristic of the participant comprising one or more of skin color, gender, hair color, hair length, and eye color.

16. The process of claim 1, wherein the input video data comprise a virtual meeting, a recorded camera feed, or a broadcast camera feed.

17. A non-transitory computer readable medium comprising instructions that when executed by a processor execute a process comprising:
receiving, into a computer processor, input video data comprising a participant;
analyzing the input video data to identify a gesture or a movement made by the participant;
selecting an overlay image as a function of the gesture or the movement made by the participant;
incorporating the overlay image into the input video data, thereby generating output video data comprising the overlay image;
transmitting the output video data to one or more participant devices;
receiving the input video data from a plurality of participants at a substantially simultaneous time;
generating an order of the input video data from the plurality of participants; and
transmitting the output video data as a function of the order.

18. A system comprising:
a computer processor; and
a computer storage device coupled to the computer processor;
wherein the computer processor and the computer storage device are operable for:
receiving, into a computer processor, input video data comprising a participant;

analyzing the input video data to identify a gesture or a movement made by the participant;

selecting an overlay image as a function of the gesture or the movement made by the participant;

incorporating the overlay image into the input video data, thereby generating output video data comprising the overlay image; and transmitting the output video data to one or more participant devices;

wherein the overlay image comprises a substantially entire portion of the output video data.

19. The process of claim 1, comprising:

analyzing a field of view of the input video data;

determining that the participant is no longer in the field of view of the input video data; and transmitting an indication to the one or more participant devices regarding a status or availability of the participant.

\* \* \* \* \*